United States Patent Office 2,838,470
Patented June 10, 1958

2,838,470

COPOLYMERIZATION OF ACRYLONITRILE AND ANOTHER UNSATURATED MONOMER IN THE PRESENCE OF PREFORMED INTERPOLYMER

Harry W. Coover, Jr., Kingsport, Tenn., assignor to Eastman Kodak Company, Rochester, N. Y., a corporation of New Jersey No Drawing. Application February 3, 1954
Serial No. 408,012

12 Claims. (Cl. 260—45.5)

This invention relates to modified polyacrylonitriles and to a process for their preparation.

This application is a continuation-in-part of my copending applications Serial No. 279,210, filed March 28, 1952 (now abandoned) and Serial No. 316,060, filed October 21, 1952 (now abandoned).

In copending application Serial No. 164,854, filed May 27, 1950 (now United States Patent No. 2,649,434, dated August 18, 1953) of Coover and Dickey, it is shown that valuable polymer products can be obtained by polymerizing acrylonitrile in the presence of preformed "live" homopolymers of various unsaturated monomeric compounds, i. e. homopolymers which have not been separated from their polymerization reaction mixtures, the acrylonitrile being then added to the mixture and the polymerization continued to completion. In copending application Serial No. 198,761 filed December 1, 1950 (now United States Patent No. 2,620,434, dated December 2, 1952) of Coover and Dickey, it is shown that still other valuable polymer products can be obtained by polymerizing acrylonitrile in the presence of "dead" homopolymers and copolymers of various unsaturated monomeric compounds, i. e. polymers which have been first isolated from their polymerization reaction mixtures and then acrylonitrile polymerized in the presence of the isolated polymer. In copending application Serial No. 198,762, filed December 1, 1950 (now United States Patent No. 2,657,191, dated October 27, 1953) of Coover and Dickey, it is shown that other valuable polymer products can be obtained by polymerizing acrylonitrile in the presence of "live" interpolymers of various unsaturated monomeric compounds. The processes used in the above applications are all concerned with the homopolymerization of acrylonitrile in the presence of a preformed polymer. Modified acrylonitrile polymers of this kind can be spun into fibers having greatly increased moisture absorption and dyeability. Such fibers have, in addition, all the other desirable physical properties exhibited by fibers produced from straight polyacrylonitrile. They can readily be dry or wet spun into high strength fibers exhibiting various degrees of extensibility depending upon the extent to which and the conditions under which the fibers were drafted. For example, if the fibers are drafted over a range of 100–600 percent and relaxed, the extensibility of the yarn will increase something on the order of 30 percent at low drafts down to 17 or 18 percent at high drafts. Under the maximum drafting and relaxing conditions, it is not possible with these polymers to obtain fibers having extensibility exceeding 30 percent and still retaining tenacity in the order of 2.5–3.0 g. per denier. However, from a textile point of view, it would be highly desirable to be able to produce fibers having not only the outstanding properties such as moisture absorption, dye affinity and other valuable physical properties, but also an extensibility in the range of 30–50 percent.

Polymers prepared according to the processes of the above pending applications can be dissolved in common acrylonitrile polymer solvents up to a limit of about 20 percent solids to give solutions or dopes which are practical for high temperature dry or wet spinning processes. Higher concentrations of these polymers cannot be used due to the tendency of the polymer dopes to set up in the form of a gel. However, from a production point of view it is highly desirable to be able to prepare dopes containing higher concentrations of polymer, i. e. 25 percent or higher, because such higher solids dopes make it possible to produce fibers at a much faster rate. Furthermore, higher solids solutions would be more practical in that less solvent is required per pound of polymer; also the actual spinning costs are less in that less solvent per pound of spun fiber has to be extracted in the wet spinning process or volatilized in a dry spinning process. Another consideration is that in wet or dry spinning processes, especially for high solids dopes, it is necessary to filter the solution free of extraneous materials and gelled particles that may be present so that they will not plug the spinneret. To facilitate filtration, it is necessary to maintain solution temperatures sufficiently high to dissolve completely the polymer and give a homogeneous solution. However, it is well known that solutions of acrylonitrile polymers discolor on heating, which results in poor yarn color. Accordingly, from a product and high quality yarn point of view, it would be highly desirable to provide an acrylonitrile polymer which could be dissolved to give dopes having polymer solids content substantially greater than 25 percent which at the same time could be filtered at relatively low temperatures, thereby making it possible to produce yarns at lower costs and having greatly improved color.

I have now made the unusual and valuable discovery that when small amounts of one or more modifying unsaturated monomers are copolymerized with acrylonitrile in the presence of certain "live" copolymers, i. e. copolymers which have not been separated from their polymerization reaction mixtures, the products obtained show not only good moisture absorption and dyeability, but other greatly improved properties which are especially valuable for textile purposes. For example, we have found that polymers prepared in accordance with the invention are much more readily soluble in acrylonitrile polymer solvents, and their solutions or dopes can be made up to contain from 25–40 percent polymer solids, and that such dopes remain clear, flowable and filterable without any gelling at temperatures below 100° C., in contrast to hitherto known high solids acrylonitrile polymer dopes which still exhibit gelling effects at temperatures substantially above 100° C., for example 100° C. and even higher, and result in discolored fiber and yarn. Furthermore, when the polymers of the invention are spun either by dry spinning or wet spinning processes, the fibers obtained can be more readily drafted and exhibit greatly improved extensibility for any given tenacity, i. e. in the range of 40–50 percent.

It is, accordingly, an object of the invention to provide a new class of modified acrylonitrile polymers or compositions. Another object is to provide a process for preparing these new polymers. Still another object is to provide homogeneous solutions having a polymer solids content of from about 25–40 percent, based on the total weight of the solution. A further object is to provide improved fibers from these compositions and from solutions thereof. Other objects will become apparent hereinafter.

In accordance with the invention, I prepare my new compositions or polymers by subjecting to polymerizing conditions a dispersion of from 5 to 95 parts by weight of a mixture comprising from 85.0 to 99.5 percent by weight of acrylonitrile and from 15.0 to 0.5 percent by weight of one or more other different monoethylenically unsaturated, polymerizable compound containing a I 

group, or more especially a

II 

group, in the presence of from 95 to 5 parts by weight of a "live" modifying binary copolymer obtained by copolymerizing from 1 to 99%, but preferably from 5 to 95%, by weight of a monomer selected from the group consisting of acrylamides, maleamides, fumaramides, itaconamides, citraconamides, maleamates, fumaramates, itaconamates, citraconamates, acrylates and vinyl carboxylic esters, and from 99 to 1%, but preferably from 95 to 5%, by weight of another different monomer selected from the above group of acrylamides, maleamides, fumaramides, etc. or acrylonitrile, until from about 70% to substantially 100% of the monomers present have been converted to copolymer, the said copolymer being still retained in its original polymerization reaction mixture and employed in this form in my invention. Since the modifying copolymer is used without separation, it will be understood that where the conversion of the monomers to copolymer is less than 100%, the remaining monomers will function similar to the other monoethylenically polymerizable, unsaturated compounds and copolymerize therewith and with the acrylonitrile in the graft polymerization step. An alternate method for preparing generally similar resinous compositions is to employ a "reverse" process, i. e. wherein from 5 to 95 parts by weight of a mixture comprising from 85.0 to 99.5% by weight of acrylonitrile and from 15.0 to 0.5% by weight of one or more other different monoethylenically unsaturated, polymerizable compounds containing a —CH=C= group, is first substantially completely polymerized to a "live" copolymer, and then without separating the copolymer from its polymerization reaction mixture, adding to the reaction mixture from 95 to 5 parts by weight of a mixture consisting of from 1 to 99%, but preferably from 5 to 95%, by weight of a monomer selected from the above mentioned group of acrylamides, maleamides, fumaramides, itaconamides, citraconamides, maleamates, fumaramates, itaconamates, citraconamates, acrylates and vinyl carboxylic esters and from 99 to 1, but preferably from 95 to 5, percent by weight of a different monomer selected from the above group of acrylamides, maleamides, fumaramides, etc., or acrylonitrile, and continuing the polymerization until from 70% to substantially 100% of the added monomers are substantially polymerized.

The acrylamides provide modifying polymers which are especially useful in practicing my invention. Those of my new compositions which contain from 60 to 95 percent by weight of acrylontrile have been found to be especially useful as fiber-forming materials. However, all of my compositions in the 5 to 95 percent range of acrylonitrile content are compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile. Monomers whose polymers were not heretofore compatible with polyacrylonitrile can thus be polymerized according to my invention to give polymers which are highly compatible with polyacrylonitrile.

The acrylamides whose polymers can be advantageously used in practicing this invention comprise those represented by the following general formula III 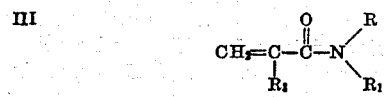

wherein R and R₁ each represents a hydrogen atom or alkyl group containing from 1 to 4 carbon atoms (e. g. methyl, ethyl, propyl, isopropyl, butyl, isobutyl, etc. groups) and R₃ represents a hydrogen atom or a methyl group. Typical acrylamides include acrylamide, N-methyl acrylamide, N-ethyl acrylamide, N-isopropyl acrylamide, N-n-butyl acrylamide, methacrylamide, N-methyl methacrylamide, N-ethyl methacrylamide, N-isopropyl methacrylamide, N,N-dimethyl acrylamide, N,N-dimethyl acrylamide, N,N-dimethyl methacrylamide, etc.

As maleamides, I can advantageously use those represented by the following general formula:

IV 

wherein R and R₁ are above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, I can advantageously use those represented by the following general formula:

V 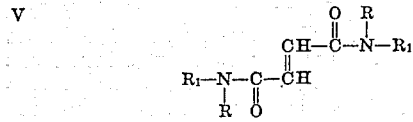

wherein R and R₁ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-N'-ethyl fumaramide, N-methyl-N'-butyl fumaramide, N,N'-tetramethyl fumaramide, N,N'-tetraethyl fumaramide, N,N-dimethyl-N,N'-diethyl fumaramide, etc.

As itaconamides, I can advantageously use those represented by the following general formula:

VI 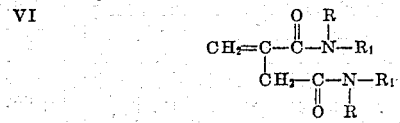

wherein R and R₁ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides I can advantageously use those represented by the following general formula:

VII 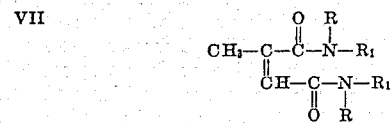

wherein R and R₁ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers I can advantageously use comprise those represented by the following general formula:

VIII 

wherein R and R₁ are as above defined and R₂ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

As fumaramates, I can advantageously use those represented by the following general formula:

IX
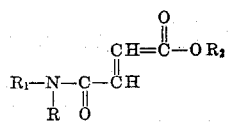

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl n-butyl fumaramate, the N-dibutyl methyl fumaramates, etc.

As itaconamates, I can advantageously use those represented by the following general formulas:

X
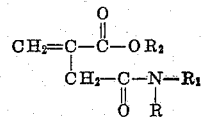

and

XI
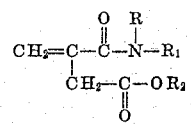

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, I can advantageously use those represented by the following general formulas:

XII
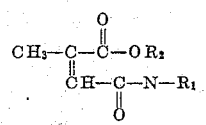

and

XIII
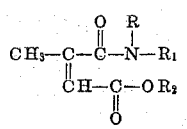

wherein R, $R_1$ and $R_2$ are as above defined. Typical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers I can advantageously use comprise those represented by the following general formula:

XIV
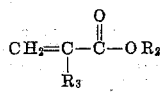

wherein $R_2$ and $R_3$ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters I can advantageously use those represented by the following general formula:

XV
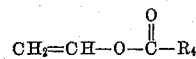

wherein $R_4$ represents an alkyl group containing from 1 to 3 carbon atoms. Typical esters include vinyl formate, vinyl acetate, vinyl propionate, vinyl butyrate, etc.

The monoethylenically unsaturated, polymerizable organic compounds represented by Formulas I and II above include the compounds represented by Formulas III to XV, in addition to other monomeric compounds coming within the scope thereof, such as styrene, α-methylstyrene, p-acetaminostyrene, α-acetoxystyrene, vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, methacrylonitrile, N-vinyl phthalimide, vinyl sulfonamide, ethylene, isobutylene, etc.

Advantageously, the polymerizations are carried out in aqueous medium, although other reaction media such as organic solvents can be employed. The term dispersion herein is intended to include both true solutions and emulsions in aqueous or nonaqueous media. For example, a polymerization medium consisting of aqueous acetone or other aqueous solvent can be used. The polymerizations can be accelerated by heat, by actinic light such as ultraviolet light and by the use of well-known polymerization catalysts. Such catalysts are commonly used in the art of polymerization, and our invention is not to be limited to any particular catalyst material. Catalysts which have been found to be especially useful comprise the peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal persulfate ammonium persulfate, etc.). Other catalysts such as the ketazines, azines, etc. can be used. The quantity of catalyst used can be varied, depending on the monomer, amount of diluent, etc. Sufficient catalyst can be used to homopolymerize the ethenoid monomer selected from those represented by the above general formulas and the monomeric acrylonitrile, or an amount of catalyst sufficient to polymerize only the ethenoid monomer can be used, and additional catalyst can be added with the acrylonitrile monomer to complete the polymerization. The catalyst added along with acrylonitrile may be the same catalyst that was used to polymerize the other ethenoid monomer. I have found that it is especially advantageous to use an amount of catalyst sufficient to polymerize only the first monomer, and then upon addition of the acrylonitrile to add a further amount of catalyst at that time. This procedure provides a readier means for regulating the molecular weight distribution of the polymer composition.

The temperatures at which the process of my invention can be carried out vary from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium laury sulfate), akali metal salts of aromatic sulfonic acids (sodium isobutyl naphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

Instead of using an aqueous medium in the polymerizations, it is also possible to use organic solvents such as acetonitrile, aromatic hydrocarbons such as benzene, toluene, etc., liquid alkanes such as n-heptane, etc., aliphatic ethers, acetone, etc. Organic solvents which are water-soluble can also be used with water in the polymerizations. The term dispersion is intended to include both true solutions and emulsions.

The polymerizations can also be carried out in a continuous manner, especially in the second step of polymerization, i. e. wherein the acrylonitrile and the other polymerizable monomer or monomers are copolymerized in the presence of the "live" preformed binary copolymer. The products formed by this method have a number of advantages, for example, they are more homogeneous and have certain improved properties such as better solubility over the products obtained from analogous batch processes. The continuous polymerizations contemplated herein fall into two main groups: (1) those which are used in equipment which permits the continuous addition of reactants and the continuous removal of product (continuous process) and (2) those which are used in batch reactions wherein one or more of the reactants is added continuously during the course of the polymerization, but from which no material is removed during the reaction (continuous batch process). In the preferred process, acrylonitrile and the other monomer or monomers containing the specified amount of a regulator such as tertiary dodecyl mercaptan is placed in a suitable storage or supply vessel under an atmosphere of nitrogen. In another storage vessel there is placed under nitrogen, air-free deionized water containing the appropriate amounts of other reactants such as the "live" preformed copolymer modifier contained in its polymerization reaction mixture which may contain some unreacted monomer, an appropriate amount of additional catalyst and an acidic reagent such as phosphoric acid for adjusting the pH of the reaction mixture. A third vessel contains an activator such as potassium metabisulfite in solution in air-free deionized water.

The preferred procedure is to draw continuously the appropriate amounts of solutions or dispersions from the supply vessels to the reactor, subject the mixture to polymerizing conditions, and continuously remove from the reactor the modified polymer containing from 5 to 95% by weight of combined acrylonitrile. By this means from 70% to substantially 100% of the monomer can be converted to modified polymer. The length of time between the addition of ingredients to the reactor and the removal of polymer is defined as the contact time. At equilibrium, the polymer emulsion or slurry is removed from the reactor by suitable means at the same total rate as ingredients from the storage vessels are being added. Thus, the contact time in the reactor can be conveniently controlled by the absolute rate of addition of the reactants. Usually, the contact time is between 1 and 3 hours, although longer periods in some cases are advantageous. It will be understood, however, that the above process can be varied in a number of ways. For example, the ingredients to be added can be combined or separated by using a larger number of vessels, or as a practical minimum—two storage vessels, one for the activator and one for the other ingredients. Also the other monomer can be added to the reactor separately or in combination with the acrylonitrile or in combination with one or more of the other ingredients.

In the other continuous process, i. e. the continuous batch process, the various ingredients can also be added to the reactor in a number of ways, for example, as follows: (a) the catalyst, activator, acid component, copolymer modifier, water, etc. are placed in the reaction vessel, and the monomers and regulator are added continuously; (b) the monomers, regulator, catalyst, acid component, copolymer modifier, water, etc., are placed in the reaction vessel and the activator is added continuously; (c) the monomers, regulator, activator, acid component, copolymer modifier, water, etc., are placed in the reaction vessel and the catalyst is added continuously; (d) the monomers, regulator, acid component, copolymer modifier, water, etc., are placed in the reaction vessel and both catalyst and activator, combined or separate, are added continuously; (e) the copolymer modifier, catalyst, acid component and water are placed in the reaction vessel, and the monomers and activator, combined or separate, are added continuously; (f) processes similar to (a) through (e), except that the acid component is eliminated; and (g) processes similar to (a) through (f), except that the activator is eliminated. For further details of the continuous process, reference can be had to copending application of Coover and Shields, Serial No. 407,954, filed of even date herewith.

The following examples will serve to illustrate further the manner whereby I practice my invention.

Example 1

2.5 g. of fumaramide, 0.5 g. of acrylonitrile were emulsified in 75 cc. of distilled water containing 0.05 g. of ammonium persulfate, 0.05 g. of sodium bisulfite, and 1 g. of a sulfonated ether (Triton 720). The resulting emulsion was then heated at 35° C. for 12 hours. There was then added 6.9 g. of acrylonitrile, 0.1 g. of fumaramide, 0.1 g. of ammonium persulfate and 0.1 g. of sodium bisulfite and the polymerization mixture was heated at 35° C. for an additional 12 hours. The precipitated polymer was obtained in an 85 percent yield and contained 69 percent by weight of acrylonitrile based on analysis. Fibers spun by extruding the solution of the polymer product in N,N-dimethylformamide into a precipitating bath had a softening temperature of 215° C., an extensibility of 26 percent and showed excellent affinity for dyes. Fibers obtained from the solution of the mechanical mixture of 5 parts polyacrylonitrile and 95 parts of the above polymer and extruding the solution into a precipitating bath, had a tenacity of 3.2 g. per denier, an extensibility of 24 percent and a sticking temperature of 215° C.

Example 2

6.8 g. of acrylonitrile, 0.2 g. of N,N-dimethylfumaramide were emulsified in 100 cc. of distilled water having dissolved therein 0.1 g. potassium persulfate, 0.1 g. of sodium bisulfite, 1 g. of orthophosphoric acid, and 2 g. of aryloxypolyalkylene sulfonated ether (Triton 720). The emulsion was then heated at 35° C. for 8 hours. There was then added 1 g. of acrylonitrile and 2 g. of N,N'-dimethylfumaramide and heating was resumed for an additional 12 hours at 50° C. The precipitated polymer was obtained in a 93 percent yield and contained 68 percent by weight of acrylonitrile on analysis. Fibers spun by extruding the solution of the polymer product in N,N-dimethylformamide into a precipitating bath, had a softening point of 220° C., an extensibility of 24 percent, and showed excellent dye susceptibility.

Example 3

1 g. of N,N,N',N'-tetramethylfumaramide and 1 g. of N,N-dimethylacrylamide were emulsified in 50 cc. of water containing 0.05 g. (calculated as 100 percent) of hydrogen peroxide 0.5 g. of oxalic acid and 2 g. of aryl-oxylpolyalkylene sulfonated ether (Triton 720) and the solution was heated at 50° C. for 12 hours. The solution was cooled to room temperature and 7.5 g. of acrylonitrile, 0.5 g. of N,N-dimethylacrylamide, and 0.1 g. (calculated as 100 percent) of hydrogen peroxide were added. Heating was then continued for an additional 16 hours at 50° C. The precipitated polymer was obtained in a 95 percent yield and contained 8 percent by weight of N,N,N',N'-tetramethylfumaramide and 9.3 percent by weight of N,N-dimethylacrylamide. Fibers spun by extruding the solution of the polymer product in N,N-dimethylformamide into a precipitating bath, had a softening point of 210° C., an extensibility of 26 percent and showed excellent affinity for dyes. The polymers can be mixed with polyacrylonitrile or copolymers of acrylonitrile containing 85 percent or more of acrylonitrile in all proportions and dissolved to give stable solutions which do not separate into distinct layers on standing, and from which fibers and films of homogeneous character can be spun, extruded or cast.

Example 4

1 g. of N,N'-di-isopropylfumaramide and 1.5 g. of N,N'-diethylmaleamide were emulsified in 100 cc. of distilled water having dissolved therein 0.05 g. of ammonium persulfate, 0.05 g. of sodium bisulfite, and 3 g. of potassium laurate. The solution was then heated at 40° C. for 12 hours, at the end of which time the solution was cooled to room temperature. There was then added 7.1 g. of acrylonitrile, .4 g. of N,N'-di-isopropylfumaramide, 0.1 g. of ammonium persulfate, and 0.1 g. of sodium bisulfite and the reaction mixture was heated an additional 12 hours at 35° C. The precipitated polymer was obtained in a 94 percent yield and contained approximately 71 percent acrylonitrile on analysis. Fibers spun by extruding the solution of the polymer product in N,N-dimethylformamide into a precipitating bath, had a softening point of 225° C., an extensibility of 27 percent and showed good dye affinity. Fibers obtained from a solution of a mechanical mixture of 95 parts polyacrylonitrile and 5 parts of the above polymer and extruding the solution into a precipitating bath, had a tenacity of 3.5 g. per denier, an extensibility of 24 percent and a sticking temperature of 225° C.

Example 5

1 g. of methylmethacrylate and 2 g. of N,N'-dimethylmaleamide were dissolved in 50 cc. of acetonitrile containing 0.5 g. of benzoyl peroxide and the solution was heated at 50° C. for 24 hours. The solution was cooled to room temperature and 6.5 g. of acrylonitrile, 0.5 g. of methylmethacrylate, and 0.1 g. of benzoyl peroxide were added. The reaction mixture was then heated at 50° C. for an additional 16 hours. The precipitated polymer was obtained in a 96 percent yield and contained approximately 65 percent acrylonitrile on analysis. Fibers spun by extruding the solution of the polymer product obtained above in N,N-dimethylacetamide into a precipitating bath, had a softening point of 215° C., an extensibility of 27 percent and showed excellent affinity for dyes. The polymers can be mixed with polyacrylonitrile or copolymers of acrylonitrile containing 85 percent or more of acrylonitrile and dissolved to give stable solutions which do not separate into distinct layers on standing and from which fibers and films of homogeneous character can be spun, extruded or cast.

Example 6

1 g. of vinyl acetate and 1 g. of N-methylfumaramide were suspended in 18 cc. of distilled water containing 0.02 g. of ammonium persulfate, 0.02 g. of sodium bisulfite, and 1.1 g. of Triton 720 (a sulfonated ether). The resulting emulsion was then heated at 50° C. for 16 hours. After cooling to room temperature a dispersion of 7.1 g. of acrylonitrile, 0.9 g. of vinyl acetate, and 0.1 g. of ammonium persulfate and 0.1 g. of sodium bisulfite and 1 g. of Triton 720 (a sulfonated ether) in 50 cc. of distilled water was added. The reaction mixture was then tumbled at 50° C. for 12 hours. The precipitated polymer weighed 9.7 g. and contained 9 percent by weight of N-methyl fumaramide on analysis. Fibers spun by extruding the solution of the polymer product in N,N-dimethylformamide into a precipitating bath, had a softening point of 215° C. and showed good dye affinity. The polymers can be mixed with polyacrylonitrile or copolymers of acrylonitrile containing 85 percent or more acrylonitrile in all proportions and dissolved to give clear, stable solutions which do not separate into distinct layers when standing, and from which fibers and films of homogeneous character can be spun, extruded or cast. Fibers obtained from the solution of the mechanical mixture of 50 parts polyacrylonitrile and 50 parts of the above polymer and extruding the solution into a precipitating bath had a tenacity of 3.4 g. per denier, an extensibility of 26 percent and a sticking temperature of 210° C.

Example 7

1.3 g. of N,N-dimethylethylfumaramate and 1 g. of methyl fumaramate were suspended in 20 cc. of distilled water containing 0.02 g. of ammonium persulfate, 0.02 g. of sodium bisulfite and 1 g. of Triton 720 (a sulfonated ether). The resulting emulsion was then heated at 50° C. for 16 hours. After cooling to room temperature, a dispersion of 7 g. of acrylonitrile, .7 g. of N,N-dimethylethylfumaramate, 0.1 g. of ammonium persulfate, 0.1 g. of sodium bisulfite and 1 g. of Triton 720 (a sulfonated ether) in 50 cc. of water was added. The dispersion was tumbled end over end at 50° C. for an additional 12 hours. The precipitated polymer weighed 9.4 g. and contained 29 percent by weight of the fumaramates by analysis. Fibers spun by extruding a solution of the polymer product in γ-butyrlactone into a precipitating bath, had a softening point of 220° C., an extensibility of 34 percent and showed good dye affinity.

The polymers can be mixed with polyacrylonitrile in all proportions and dissolved to give stable solutions which do not separate into distinct layers on standing and from which fibers and films of homogeneous character can be spun, extruded or cast.

Example 8

2.4 g. of methyl-α-acetaminoacrylate and 2 g. of N-methyl methylmaleamate were added to a solution of 0.05 g. of ammonium persulfate, 0.05 g. of sodium bisulfite and 2 g. of Triton 720 (a sulfonated ether) in 75 cc. of distilled water. The reaction mixture was then heated at 35° C. for 8 hours. After cooling to room temperature, 5 g. of acrylonitrile, .6 g. of methyl-α-acetaminoacrylate, 0.05 g. of ammonium persulfate and 0.05 g. of sodium bisulfite were added and heating was continued for 8 hours at 35° C. The resulting polymer was obtained in a 95 percent yield and contained 29 percent by weight of methyl-α-acetaminoacrylate by analysis. Fibers spun by extruding a solution of this polymer product in N,N-dimethylformamide into a precipitating bath, had a softening point of 235° C., an extensibility of 36 percent and showed excellent affinity for dyes.

Example 9

1 g. of acrylonitrile and 3 g. of N-methyl methylitaconamate were emulsified in 50 cc. of distilled water containing 0.04 g. of potassium persulfate and 0.04 g. of ammonium bisulfite and 1 g. of potassium laurate. The resulting emulsion was heated for 16 hours at 25° C. and cooled to room temperature, then 5.1 g. of acrylonitrile and 0.9 g. of vinyl acetate were added along with 0.06 g. potassium persulfate. The reaction mixture was allowed to stand for 48 hours at room temperature. The precipitated product was then filtered, washed several times with fresh sources of distilled water and dried. There was thus obtained 9.5 g. of polymer containing 29 percent by weight of N-methyl methylitaconamate. Fibers prepared from this polymer had a softening point of 205° C., an extensibility of 37 percent and showed good dye affinity.

*Example 10*

4.9 g. of N-isopropylmethacrylamide, 1 g. of N,N-dimethyl methylitaconamate were dissolved in 50 cc. of acetonitrile containing 0.1 g. of benzoyl peroxide. The resulting solution was heated for 16 hours at 50° C. and cooled to room temperature. There was then added 4 g. of acrylonitrile, 0.1 g. of N-isopropylmethacrylamide and 0.1 g. of benzoyl peroxide and the reaction mixture heated for an additional 12 hours at 50° C. The product was filtered off, washed with distilled water and dried. The dried product contained approximately 40.0 percent by weight of acrylonitrile and a stable homogeneous solution resulted when the product was dissolved in N,N-dimethylacetamide containing polyacrylonitrile.

*Example 11*

3 g. of N-isopropylethylitaconamate and 4.3 g. of methyl citraconamate were emulsified in 75 cc. of distilled water containing 0.1 g. of ammonium persulfate and 0.1 g. of sodium bisulfite and 4 g. of Triton 720 (a sulfonated ether). The resulting emulsion was heated at 50° C. for 16 hours. After cooling to room temperature, 2 g. of acrylonitrile, 0.2 g. of methylcitraconamate, 0.1 g. of ammonium persulfate and 0.01 g. of sodium bisulfite were addded. The reaction mixture was then tumbled end over end for 12 hours at 50° C. The product was filtered off, washed with water and dried. It contained 20 percent by weight of acrylonitrile on analysis and formed homogeneous solutions in N,N-dimethylformamide with polyacrylonitrile.

*Example 12*

6.8 g. of N-methylisopropylcitraconamate and 2 g. of acrylonitrile were suspended in 150 cc. of distilled water containing 1.5 cc. of 7-ethyl-2-methylundecane-4-sulfonic acid sodium salt (Tergitol No. 4), 0.1 g. of ammonium persulfate and 0.1 g. of sodium bisulfite. After tumbling the reaction mixture in a crown-capped bottle for 20 hours in a water bath heated at 35° C., the resulting emulsion was diluted to 230 cc. with distilled water and 23 g. of acrylonitrile, 1.2 g. of N-methylisopropylcitraconamate were added along with 1.5 cc. of 7-ethyl-2-methylundecane-4-sulfonic acid sodium salt (Tergitol No. 4), 0.23 g. of ammonium persulfate, 0.23 g. of sodium metabisulfite and 1.35 g. of 85 percent phosphoric acid. The reaction mixture was then heated for an additional 8 hours at 35° C. with tumbling, cooled to room temperature and the polymer product precipitated by the addition of a saturated sodium chloride solution to the reaction vessel. The polymer was filtered off, washed twice with hot water and then dried. The yield amounted to 31.4 g. and the product was found to contain 23 percent by weight of N-methylisopropylcitraconamate on analysis. It gave homogeneous solutions in N,N-dimethylformamide.

*Example 13*

2 g. of N-methyl methacrylamide and 0.02 g. of acrylonitrile were dissolved in 75 cc. of water (distilled) containing 0.05 g. of ammonium persulfate and 0.05 g. of sodium bisulfite. The polymerization mixture was then heated at 35° C. for 12 hours. There were then added 7.48 g. of acrylonitrile, 0.5 g. of N-methyl methacrylamide, 0.1 g. of ammonium persulfate and 0.1 g. of sodium bisulfite and the polymerization mixture was heated at 35° C. for an additional 12 hours. The precipitated product was obtained in a 90 percent yield and contained 24 percent by weight of N-methyl methacrylamide. Fibers spun by extruding a solution of the polymer product in N,N-dimethylformamide into a precipitating bath, had a softening point of 210° C., an extensibility of 28 percent and showed excellent affinity for dyes. Fibers obtained by preparing a solution from the merchanical mixture of 5 parts of the above polymer and 95 parts of polyacrylonitrile and extruding the solution into a precipitating bath, had a tenacity of 3.4 g. per denier, an extensibility of 22 percent, a sticking temperature of 210° C. and shrank only 6 percent in boiling water.

*Example 14*

1 g. of acrylonitrile and 2 g. of N-methylacrylamide were added to 100 cc. of distilled water, having dissolved therein 0.05 g. of potassium persulfate and 1 g. of ortho phosphoric acid. The solution was then heated at 50° C. for 12 hours. There were added 6.9 g. of acrylonitrile, 0.1 g. of dimethylfumarate. 0.1 g. of potassium persulfate, 0.1 g. of sodium bisulfite to the cooled reaction mixture and heating was resumed for 8 hours at 35° C. The precipitated polymer was obtained in a 90 percent yield and contained 18 percent by weight of N-methyl acrylamide. Fibers spun by extruding a solution of the polymer in N,N-dimethylformamide into a precipitating bath, had a softening point of 220° C. and showed excellent dye susceptibility. Fibers obtained by preparing a solution from a mechanical mixture of 95 parts polyacrylonitrile and 5 parts of the above polymer and extruding the solution into a precipitating bath, had a tenacity of 3.4 g. per denier, an extensibility of 20 percent, a sticking temperature of 210° C. and shrank only 5 percent in boiling water.

*Example 15*

1 g. of methacrylamide and 1 g. of N,N-dimethylacrylamide were added to 50 cc. of water containing 0.05 g. (calculated as 100 percent) hydrogen peroxide and 0.5 g. of oxalic acid and the solution was heated at 50° C. for 12 hours. The solution was cooled to room temperature and 7.7 g. of acrylonitrile, .3 g. of methacrylamide and 0.1 g. (calculated as 100 percent) of hydrogen peroxide were added. Heating was then continued for an additional 16 hours at 50° C. The precipitated polymer was obtained in a 92 percent yield and contained 9 percent by weight of N,N-dimethylacrylamide. Fibers spun by extruding a solution of the polymer product in N,N-dimethylformamide into a precipitating bath, had a softening point of 195° C., an extensibility of 26 percent and showed excellent affinity for dyes.

*Example 16*

2.47 g. of N,N'-dimethylitaconamide and 0.03 g. of acrylamide were added to 100 cc. of distilled water having dissolved therein 0.05 g. of ammonium persulfate and 0.05 g. of sodium bisulfite. The solution was then heated at 40° C. for 12 hours, at the end of which time the solution was cooled to room temperature. There were then added 7 g. of acrylonitrile, 0.5 g. of styrene, 0.1 g. of ammonium persulfate and 0.1 g. of sodium bisulfite and the reaction mixture was heated for an additional 12 hours at 35° C. The precipitated polymer was obtained in a 92 percent yield and contained approximately 24 percent by weight of N,N'-dimethylitaconamide. Fibers spun by extruding a solution of the polymer product in N,N-dimethylformamide into a precipitating bath had a softening point of 220° C. and showed good affinity for dyes. Fibers obtained by preparing a solution from a mechanical mixture of 50 parts of the above polymer and 50 parts of an acrylonitrile polymer containing 90 percent acrylonitrile and 10 percent vinyl acetate and extruding the solution into a precipitating bath, had a tenacity of 3.2 g. per denier, an extensibility of 28 percent, a sticking temperature of 190° C., and shrank only 12 percent in boiling water.

Example 17

1 g. of methyl methacrylate and 2 g. of N-methylacrylamide were dissolved in 50 cc. of acetonitrile containing 0.05 g. of benzoyl peroxide and the solution was heated at 50° C. for 24 hours. The solution was cooled to room temperature and 6.8 g. of acrylonitrile, .2 g. of isopropenyl acetate and 0.1 g. of benzoyl peroxide were added. The reaction mixture was then heated at 50° C. for an additional 16 hours. The precipitated polymer was obtained in a 95 percent yield and contained 19.5 percent by weight of N-methylacrylamide on analysis. Fibers spun by extruding a solution of the polymer product obtained above in N,N-dimethylacetamide into a precipitating bath, had a softening point of 205° C., an extensibility of 28 percent and showed excellent affinity for dyes. Fibers obtained by preparing a solution from a mechanical mixture of 95 parts of the above polymer and 5 parts of an acrylonitrile polymer containing 95 percent of acrylonitrile and 5 percent isopropenyl acetate and extruding the solution into a precipitating bath, had a tenacity of 3.1 g. per denier, an extensibility of 25 percent, a sticking temperature of 195° C. and shrank only 12 percent in boiling water.

Example 18

7.5 g. of acrylonitrile and 0.5 g. of methyl methacrylate were emulsified in 80 cc. of water containing 2 g. of Triton 720 (a sulfonated ether), 0.1 g. of ammonium persulfate and 0.1 g. of sodium bisulfite. The resulting emulsion was then heated at 50° C. for 16 hours and after cooling to room temperature, a dispersion of 1 g. of vinyl acetate, 1 g. of methyl methacrylate suspended in 18 cc. of distilled water containing 0.02 g. of ammonium persulfate and 0.02 g. of sodium bisulfite and 1 g. of Triton 720 (a sulfonated ether) was added. The reaction mixture was then tumbled at 50° C. for an additional 6 hours. The precipitated polymer weighed 9.7 g. and contained 10 percent by weight of vinyl acetate on analysis. Fibers spun by extruding a solution of the polymer product in N,N-dimethylformamide into a precipitating bath, had a softening point of 200° C., an extensibility of 26 percent and showed good dye affinity.

Example 19

6.8 g. of acrylonitrile and 0.2 g. of N-methylacrylamide were emulsified in 75 cc. of water containing 2 g. of Triton 720 (a sulfonated ether), 0.1 g. of ammonium persulate, 0.1 g. of sodium bisulfite. The resulting emulsion was then heated at 35° C. for 6 hours. After cooling to room temperature, a dispersion of 2 g. of vinyl acetate and 1 g. of isopropenyl acetate in 20 cc. of distilled water containing 0.02 g. of ammonium persulfate, 0.02 g. of sodium bisulfite and 1.1 g. of Triton 720 (a sulfonated ether) was added. The dispersion was tumbled end over end at 50° C. for an additional 12 hours. The precipitated polymer weighed 9.7 g. and contained 29 percent by weight of isopropenyl and vinyl acetate on analysis. Fibers spun from a solution of the polymer product in N,N-dimethylformamide into a precipitating bath, had a softening point of 195° C., an extensibility of 26 percent and showed good dye affinity.

The polymers can be mixed with polyacrylonitrile in all proportions and dissolved to give stable solutions which do not separate into distinct layers on standing and from which fibers and films of homogeneous character can be spun, extruded or cast.

Example 20

2.5 g. of methyl-α-aminoacrylate and 2 g. of acrylonitrile were added to a solution of 0.05 g. of ammonium persulfate and 0.05 g. of sodium bisulfite in 75 cc. of distilled water. The reaction mixture was then heated to 35° C. for 8 hours. After cooling to room temperature, 5 g. of acrylonitrile, 0.5 g. of methyl-α-aminoacrylate, 0.05 g. of ammonium persulfate and 0.05 gram of sodium bisulfite were added and heated for an additional 8 hours at 35° C. The resulting polymer contained a 93 percent yield and contained 29 percent by weight of methyl-α-aminoacrylate. Fibers spun by extruding a solution of this polymer product in N,N-dimethylformamide into a precipitating bath, had a softening point of 235° C., an extensibility of 27 percent and showed excellent affinity for dyes.

Example 21

1 g. of acrylonitrile and 2.5 g. of N-methyl methacrylamide were dissolved in 50 cc. of distilled water containing 0.04 g. of potassium bisulfite and 0.04 g. of ammonium persulate. The resulting solution was heated for 16 hours at 25° C. and cooled to room temperature. Then 6 g. of acrylonitrile, 0.5 g. of N-methyl methacrylamide were added along with 0.06 g. of potassium bisulfite. The reaction mixture was allowed to stand for 48 hours at room temperature. The precipitated product was then filtered off, washed several times with fresh portions of distilled water and dried. There were thus obtained 9.2 g. of a polymer containing 26 percent by weight of N-methyl methacrylamide. Fibers prepared from this polymer had a softening point of 210° C., an extensibility of 25 percent and showed good affinity for dyes.

Example 22

1 g. of N-isopropylacrylamide and 0.5 g. of N-methyl methacrylamide were dissolved in 50 cc. of distilled water containing 0.3 g. of potassium bisulfite and 0.03 g. of potassium persulfate. The resulting solution was heated for 16 hours at 30° C. 8 g. of acrylonitrile and 0.5 g. of N-isopropylacrylamide were added along with 0.06 g. of potassium bisulfite and 0.06 g. of potassium persulfate. The reaction mixture was allowed to stand for 48 hours at room temperature. The precipitated product was then filtered off, washed several times with fresh portions of distilled water and dried. The resulting polymer was easily soluble in such solvents as N,N-dimethylacetamide, N,N - dimethylformamide and γ-butyrolactone etc., to give clear, high solids, gel-free solutions. Fibers prepared from this polymer had a high softening point and showed excellent affinity for dyes.

Example 23

2 g. of acrylonitrile and 0.2 g. of vinyl acetate were emulsified in 80 cc. of water containing 0.01 g. of ammonium persulfate, 0.01 g. of sodium bisulfite and 3 g. of Triton 720 (a sulfonated ether). The resulting emulsion was heated at 35° C. for 6 hours. After cooling to room temperature, 5 g. of vinyl acetate and 4.8 g. of methyl acrylate were suspended in 20 cc. of distilled water containing 0.1 g. of ammonium persulfate and 0.1 g. of sodium bisulfite and 3 g. of Triton 720 (a sulfonated ether) were added. The reaction mixture was then tumbled end over end for 12 hours at 50° C. The product was filtered off, washed with water and dried. It contained 18.5 percent by weight of acrylonitrile by analysis and formed homogeneous solutions in N,N-dimethylformamide with polyacrylonitrile.

Example 24

2 g. of itaconamide and 0.5 g. of N-methylacrylamide were emulsified in 80 cc. of water containing 0.05 g. of ammonium persulfate, 0.05 g. of sodium bisulfite and 3 g. of Triton 720 (a sulfonated ether). The resulting emulsion was heated at 35° C. for 12 hours. 7 g. of acrylonitrile and 0.5 of isopropenyl acetate along with 0.1 g. of ammonium persulfate and 0.1 g. of sodium bisulfite were added to the cooled emulsion. The polymerization was completed by heating at 35° C. for an additional 5 hours. The resulting polymer was obtained in a 94 percent yield and contained 69.8 percent acrylonitrile by weight based on analysis.

Example 25

2.5 g. of citraconamide and 0.5 g. of dimethylfumarate were emulsified in 90 cc. of water containing 0.05 g. of ammonium persulfate, 0.02 g. of sodium bisulfite and 2.5 g. of Triton 720 (a sulfonated ether). The resulting emulsion was heated at 35° C. for 5 hours. 6.8 g. of acrylonitrile and 0.2 g. of dimethylmaleate along with 0.1 g. of ammonium persulfate, 0.1 g. of sodium bisulfite and 1 g. of Triton 720 (a sulfonated ether) were then added. The polymerization was completed by heating at 40° C. for 4 hours. The resulting polymer was obtained in a 92 percent yield and contained 67.9 percent by weight acrylonitrile based on analysis. Fibers obtained from the polymer had a softening temperature of 210° C. and an extensibility of 29 percent.

Example 26

3.0 g. of acrylonitrile and 7.0 g. of N-methyl methacrylamide were emulsified in 40 cc. of water containing 0.15 g. of potassium persulfate and 0.01 g. of tertiary dodecyl mercaptan. The emulsion was heated at 60° C. until 94% or more of the monomers had copolymerized. This result is usually accomplished by heating for about 12 hours. The copolymer contained approximately 30% by weight of acrylonitrile and 70% by weight of N-methyl methacrylamide. The mixture was then cooled to room temperature, 50 cc. of water added and the mixture agitated until a homogeneous solution or dope containing 10% by weight of the copolymer resulted.

30.7 g. (3.07 g. of copolymer) of the above prepared solution or dope of the copolymer were placed in a jacketed reactor provided with an agitator and heat exchanger. There were then added 10 g. of acrylonitrile, 114 cc. of water, 0.58 g. of 85% phosphoric acid, 0.1 g. of potassium persulfate, 0.17 g. of potassium metabisulfite, 0.1 g. of tertiary dodecyl mercaptan and 0.56 g. of a 30% solution in water of N-methyl methacrylamide and the mixture heated, with stirring, to 35° C. and then allowed to level off at 37°–39° C. After the heat of polymerization had been removed and when the conversion of the acrylonitrile to polymer had reached 96% or more, which is usually accomplished in a period of about 12 hours, the temperature was raised to 90° C. The mother liquor was removed by centrifuging the polymerization mixture, the polymer precipitate being reslurried twice with water and centrifuged to a 70% moisture cake. The cake was dried under vacuum at 80° C. in an agitated dryer. The overall yield of modified polyacrylonitrile product was over 90%. After hammer-milling, the dry powder, now ready for spinning, was stored in a moisture proof container. A generally similar product can also be obtained by either of the continuous processes previously described.

The modified polyacrylonitrile prepared as above and containing about 18% by weight of N-methyl methacrylamide was soluble in N,N-dimethylformamide. Fibers spun by extruding a solution of the polymer product in N,N-dimethylformamide into a precipitating bath had a softening temperature of about 240° C., an extensibility of about 20–30 percent depending on the drafting and relaxing conditions, and showed excellent affinity for dyes.

Example 27

One and four-tenths g. of N-methyl methacrylamide and 0.6 g. of acrylonitrile were dissolved in 8 cc. of water along with 0.03 g. of potassium persulfate. The solution was allowed to polymerize at 60° C. to 70° conversion. There was then added 100 g. of water, 8 g. of acrylonitrile, 0.1 g. of potassium persulfate and 0.1 g. of potassium metabisulfite and the mixture was allowed to polymerize at 35° C. to a 75% conversion. The polymer product was then separated immediately from the reaction mixture by filtration yielding 7.3 g. of polymer. The polymer was readily soluble in such solvents as N,N-dimethylformamide, N,N-dimethylacetamide and γ-butyrolactone to give clear, gel-free solutions. Fibers obtained by extruding a solution of the polymer into a precipitating bath had good physical properties.

Example 28

One and four-tenths g. of N-methyl methacrylamide and 0.6 g. of acrylonitrile were dissolved in 8 cc. of water along with 0.03 g. of potassium persulfate. The solution was allowed to polymerize at 60° C. to 85% conversion. There was then added 100 g. of water, 8 g. of acrylonitrile, 0.1 g. of potassium persulfate and 0.1 g. of potassium metabisulfite and the mixture was allowed to polymerize at 35° C. to an 85% conversion. The polymer product was then immediately separated from the reaction mixture by filtration yielding 8.4 g. of polymer. The polymer was readily soluble in such solvents as N,N-dimethylformamide, N,N-dimethylacetamide and γ-butyrolactone to give clear, gel-free solutions. Fibers obtained by extruding a solution of the polymer into a precipitating bath had good physical properties.

Properties 29

Four and nine-tenths g. of N-isopropyl methacrylamide, 1 g. of N,N-dimethyl methyl itaconamate were dissolved in 50 cc. of acetonitrile containing 0.1 g. of benzoyl peroxide. The resulting solution was heated for 16 hours at 50° C. at the end of which time the polymerization was substantially complete. The reaction mixture was cooled and 4 g. of acrylonitrile, 0.1 g. of N-isopropyl methacrylamide, 0.1 g. of methyl acrylate and 0.1 g. of benzoyl peroxide were then added. The reaction mixture was heated at 50° C. until the polymerization had proceeded to 70% conversion. The product was then filtered off, washed with distilled water and dried. The dried product was readily soluble in such solvents as I,N-dimethylacetamide and N,N-dimethylformamide and stable homogeneous solutions resulted when the product was dissolved in N,N-dimethylacetamide containing polyacrylonitrile.

Example 30

Two g. of N-methyl methacrylamide and 0.2 g. of N-tertiary butyl acrylamide were dissolved in 75 cc. of water containing 0.05 g. of ammonium persulfate and 0.05 g. of sodium bisulfite. The polymerization mixture was heated at 35° C. until a 70% conversion was obtained. There was then added 7.4 g. of acrylonitrile, 0.5 g. of N-methyl methacrylamide, 0.1 g. of ammonium persulfate and 0.1 g. of sodium bisulfite and the polymerization mixture was heated at 35° C. for an additional 12 hours. At the end of this time the polymerization was essentially complete. The precipitated product was obtained in a 90% yield and was readily soluble in such solvents as N,N - dimethylacetamide and N,N - dimethylformamide. Fibers spun by extruding a solution of the polymer product in N,N-dimethylformamide into a precipitating bath had a softening point of 210° C., an extensibility of 28% and showed excellent affinity for dyes.

Example 31

One g. of N-isopropyl acrylamide and 0.5 g. of N-methyl acrylamide were dissolved in 50 cc. of distilled water containing 0.3 g. of potassium bisulfite and 0.03 g. of potassium persulfate. The solution was allowed to polymerize at room temperature to an 85% conversion. Eight g. of acrylonitrile and 0.5 g. of methyl acrylate were immediately added along with 0.06 g. of potassium bisulfite and 0.06 g. of potassium persulfate. The reaction mixture was allowed to polymerize at room temperature to a 90% conversion. The precipitated product was then filtered off, washed several times with fresh portions of distilled water and dried. The resulting polymer was easily soluble in such solvents as N,N-dimethylacetamide, N,N-dimethylformamide and γ-butyrolactone to give clear, high solids, gel-free solutions. Fibers prepared from this polymer had a high softening point and showed excellent affinity for dyes.

*Example 32*

Two and five-tenths g. of fumaramide, 0.5 g. of acrylonitrile were emulsified in 75 cc. of distilled water containing 0.05 g. of ammonium persulfate, 0.05 g. of sodium bisulfite and 1 g. of a sulfonated ether (Triton 720). The resulting emulsion was then heated or allowed to polymerize at 35° C. to an 85% conversion. There was then added 6.9 g. of acrylonitrile, 0.1 g. of fumaramide, 0.1 g. of ammonium persulfate and 0.1 g. of sodium bisulfite and the polymerization mixture was heated at 35° for an additional 12 hours. At the end of this time the polymerization had proceeded essentially to completion. The precipitated polymer was obtained in a 95% yield and contained approximately 69% by weight acrylonitrile based on analysis. Fibers spun by extruding a solution of the polymer product in N,N-dimethylacetamide into a precipitating bath at a softening temperature of 210° C., an extensibility of 28% and showed excellent affinity for dyes.

*Example 33*

Six and eight-tenths g. of acrylonitrile, 0.2 g. of N,N'-dimethylfumaramide were emulsified in 100 cc. of distilled water having dissolved therein 0.1 g. of potassium persulfate, 0.1 g. of sodium bisulfite, 1 g. of orthophosphoric acid and 2 g. of aryloxy polyalkalene sulfonated ether (Triton 720). The emulsion was then heated at 35° C. for 8 hours at the end of which time the polymerization had proceeded essentially to completion. There was then added 1 g. of acrylonitrile and 2 g. of N,N'-dimethylfumaramide. The mixture was allowed to polymerize at 50° C. to an 85% conversion. The precipitated polymer was readily soluble in such solvents as N,N-dimethylacetamide and N,N-dimethylformamide. Fibers spun by extruding the solution of the polymer product in N,N-dimethylformamide into a precipitating bath had a softening point of 215° C., an extensibility of 26% and showed excellent dye susceptibility.

*Example 34*

One g. of N,N,N'N'-tetramethyl fumaramide and 1 g. of N,N-dimethylacrylamide were emulsified in 50 cc. of water containing 0.05 g. (calculated as 100%) of hydrogen peroxide, 0.5 g. of oxalic acid and 2 g. of aryloxy polyalkalene sulfonated ether (Triton 720) and the solution was allowed to polymerize at 50° C. to a conversion of 70%. The solution was cooled to room temperature and 7.5 g. of acrylonitrile, 0.5 g. of N,N-dimethylacrylamide and 0.1 g. (calculated as 100%) of hydrogen peroxide were added. The solution was allowed to polymerize at 50° C. to a 70% conversion. The precipitated polymer was readily soluble in such solvents as N,N-dimethylformamide and N,N-dimethylacetamide. Fibers spun by extruding a solution of the polymer product in N,N-dimethylformamide into a precipitating bath had a softening point of 205° C., an extensibility of 29% and showed excellent affinity for dyes. The polymer can be mixed with polyacrylonitrile or copolymers of acrylonitrile containing 85% or more acrylonitrile in all proportions and dissolved to give stable solutions which do not separate into distinct layers on standing and from which fibers and film of homogeneous character can be spun, extruded or cast.

*Example 35*

One g. of vinyl acetate and 1 g. of N-methyl fumaramide were suspended in 18 cc. of distilled water containing 0.02 g. of ammonium persulfate, 0.02 g. of sodium bisulfite and 1.1 g. of Triton 720 (a sulfonated ether). The resulting emulsion was allowed to polymerize at 50° C. to a 90% conversion. After cooling to room temperature, a dispersion of 7.1 g. of acrylonitrile, 0.9 g. of vinyl acetate and 0.1 g. of ammonium persulfate and 0.1 g. of sodium bisulfite and 1 g. of Triton 720 (a sulfonated ether) and 50 cc. of distilled water was added. The reaction mixture was allowed to polymerize at 50° C. to a 75% conversion. The precipitated polymer was readily soluble in such solvents as N,N-dimethylacetamide and γ-butyrolactone. Fibers spun by extruding a solution of the polymer product in N,N-dimethylformamide into a precipitating bath had a softening point of 210° C. and showed good dye affinity. The polymers can be mixed with polyacrylonitrile or copolymers of acrylonitrile containing 85% or more acrylonitrile in all proportions and dissolved to give clear, stable solutions which do not separate into distinct layers when standing and from which fibers and films of homogeneous character can be spun, extruded or cast.

*Example 36*

Two g. of acrylonitrile and two-tenths g. of vinyl acetate were emulsified in 80 cc. of water containing 0.01 g. of ammonium persulfate and 0.01 g. of sodium bisulfite and 3 g. of Triton 720 (a sulfonated ether). The resulting emulsion was allowed to polymerize at 35° C. to a conversion of 85%. After cooling to room temperature, 5 g. of vinyl acetate and 4.8 g. of methyl acrylate were suspended in 20 cc. of distilled water containing 0.1 g. of ammonium persulfate and 0.1 g. of sodium bisulfite and 3 g. of Triton 720 (a sulfonated ether) were added. The mixture was allowed to polymerize at 50° C. to an 85% conversion. The product was filtered off, washed with water and dried. The product was readily soluble in such solvents as N,N-dimethylformamide and N,N-dimethylacetamide. Fibers obtained by spinning a solution of this polymer in such solvents as N,N-dimethylformamide into a precipitating bath had excellent physical properties.

*Example 37*

2.5 g. of N-methylmethacrylamide and 0.5 g. acrylamide were dissolved in 75 ml. of water containing 0.05 g. of ammonium persulphate and 0.05 g. of sodium bisulfite. Polymerization was completed by heating at 35° C. for 12 hours. 4.2 g. of vinyl chloride, 2.8 g. acrylonitrile, 0.1 g. ammonium persulphate and 0.1 g. sodium bisulfite were then added and polymerization completed by heating at 35° C. for an additional 12 hours. Precipitated polymer was obtained in 90 percent yield and contained 21 percent amide by analysis. The resultant polymer is soluble in methyl-ethylketone. Fibers obtained from the polymer have excellent affinity for dyes.

*Example 38*

1 g. of N-isopropylacrylamide was added to 100 ml. of water containing 0.05 g. of potassium persulphate and 0.05 g. of sodium bisulfite and 1 g. of orthophosphoric acid. Polymerization was completed by heating at 35° C. for 12 hours. 6.4 g. of acrylonitrile, 1.6 g. vinyl chloride, 0.1 g. potassium persulphate and 0.1 g. sodium bisulfite were added to the cooled reaction mixture and the polymerization completed by heating at 35° C. for an additional 8 hours. The precipitated polymer was obtained in a 90 percent yield and contained 18 percent amide by analysis. The polymer is solvent in such solvents as cyclohexanone and dimethylacetamide. The fibers obtained from this polymer show excellent affinity for dyes.

*Example 39*

4 g .of N,N-dimethylacrylamide were added to 100 ml. of water containing 0.01 g. of potassium persulphate and 0.01 g. of sodium bisulfite. Polymerization was completed by heating at 35° C. for 12 hours. 1.8 g. of acrylonitrile and 4.2 g. of vinyl chloride, 0.1 g. potassium persulphate and 0.1 g. of sodium bisulfite were added to the cooled reaction mixture and the polymerization was completed by heating at 35° C. for an additional 8 hours. The resultant polymer is soluble in such solvents as cyclohexanone, methylethylketone and dimethylformamide. Fibers obtained from this polymer show excellent affinity for dyes.

The preceding description and examples have set forth that the resinous compositions or polymers of the invention which contain from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention containing from 5 to 95 percent of acrylonitrile, including mixture of them with polyacrylonitrile in any proportions but preferably in the proportions of from 5 to 95 parts by weight of one or more of the polymers of the invention and 95 to 5 parts by weight of polyacrylonitrile, can be made up into solutions or dopes with one or more acrylonitrile polymer solvents, with or without added fillers, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc. from the new resinous compositions or polymers of the invention, and mixtures thereof with each other with polyacrylonitrile or with acrylonitrile polymers containing 85 percent or more of acrylonitrile, include ethylene carbonate, ethylene carbamate, γ-butyrolactone, N-methyl-2-pyrrolidone, N,N-dimethyl cyanamide, N,N-dimethyl cyanoacetamide, N,N-dimethyl-β-cyanopropionamide, glycolonitrile (formaldehyde cyanohydrin), malononitrile, ethylene, cyanohydrin, dimethyl sulfoxide, dimethyl sulfone, tetramethylene sulfone, tetramethylene sulfoxide, N-formyl pyrrolidine, N-formyl morpholine, N,N'-tetramethylene methazephosphonamide, and the like. Generally speaking, I have found that N,N-dimethyl formamide and N,N-dimethyl acetamide are particularly advantageous solvents. The amount of my new resinous compositions in the solvent can be varied from 25 to 40 percent or even higher in some cases, such solutions or dopes being especially well adapted to practical spinning operations.

In practicing this invention an especially valuable class of monomeric materials containing a —CH=C< group are the vinylpyridines including both the unsubstituted vinylpyridines such as 2-vinylpyridine and 4-vinylpyridine as well as the substituted vinylpyridines having one or more alkyl groups of from one to four carbon atoms substituted on the ring. Typical of the substituted vinylpyridines are 2-methyl-5-vinylpyridine and 2-vinyl-6-methylpyridine although any of the other substituted pyridines as described can be employed. The vinylpyridine monomers are particularly useful when employed in forming the initial copolymer which is thereafter reacted with a mixture of acrylonitrile and another monomer. Thus, for example, these or similar vinylpyridines can be copolymerized with any of the 13 classes of materials which have been specifically described hereinabove. A particularly useful copolymer for forming the modifying base is the copolymer of a vinylpyridine with an acrylamide or methacrylamide. These copolymers when reacted with a mixture of acrylonitrile and another monomer as described give modified polymers which have excellent dyeing characteristics and dyed fibers prepared therefrom show a particularly high degree of light fastness, when dyed with acetate, wool, direct or vat dyes. Modified polymers of this kind are illustrated in the following examples:

*Example 40*

4 g. of fumaramide and 6.0 g. of 2-methyl-5-vinylpyridine were emulsified in 190 ml. of distilled water containing 1.0 g. of sodium lauryl sulfate, 0.02 g. of potassium persulfate, and 0.02 g. of sodium metabisulfite. The resulting emulsion was heated at 25° C. for 15 hours. There was then added 260 cc. of distilled water, 29.0 g. of acrylonitrile, 1.0 g. of 2-methyl-5-vinylpyridine, 0.3 g. of potassium persulfate, and 0.3 g. of potassium metabisulfite. The polymerization mixture was heated at 35° C. for 15 hours. The resultant precipitated polymer was isolated by filtration. It was readily soluble in dimethylformamide and could be spun into fibers having a tenacity of 2.4 g./d.

*Example 41*

28.5 g. of acrylonitrile and 1.5 g. of itaconamide were emulsified in 190 cc. of distilled water having dissolved therein 0.3 g. of potassium persulfate, 0.3 g. of potassium metabisulfite, 1.5 g. of phosphoric acid, and 1.5 g. of sodium lauryl sulfate. The emulsion was then heated at 35° C. for 10 hours. There was then added 4 g. of itaconamide, 6 g. of 2-methyl-5-vinylpyridine, 0.02 g. of potassium persulfate, and 0.02 g. of potassium metabisulfite and heating was resumed for an additional 12 hours at 35° C. The precipitated polymer was isolated by filtration and was readily soluble in dimethylformamide. It could be spun into fibers which, when completely relaxed, had an extensibility of 27%.

*Example 42*

4 g. of citraconamide and 6.0 g. of 2-methyl-5-vinylpyridine were emulsified in 190 ml. of water containing 1 g. of sodium lauryl sulfate, 0.02 g. of potassium persulfate, and 0.02 g. of potassium metabisulfite. The resulting emulsion was heated at 25° C. for 12 hours. There was then added 260 cc. of distilled water, 28.5 g. of acrylonitrile, and 1.5 g. of citraconamide, 0.3 g. of potassium persulfate, and 0.3 g. of potassium metabisulfite. The polymerization mixture was heated at 35° C. for 12 hours. The resultant polymer was filtered and dried and was soluble in dimethylformamide.

*Example 43*

1 g. of N-methylisopropylcitraconamate and 9.0 g. of 2-methyl-5-vinylpyridine were added to a solution of 0.02 g. of potassium persulfate, 0.02 g. of potassium metabisulfite and 1.0 g. of sodium lauryl sulfate in 190 ml. of water, and the reaction mixture was heated at 25° C. for 10 hours. To the resultant emulsion was added 260 cc. of distilled water, 28.0 g. of acrylonitrile, 1.0 g. of 2-methyl-5-vinylpyridine, 1.0 g. of N-methylisopropylcitraconamate, 0.3 g. of potassium persulfate, and 0.4 g. of potassium metabisulfite. The polymerization mixture was heated at 35° C. for 15 hours. The product was completely soluble in dimethylformamide.

*Example 44*

5 g. of acrylonitrile and 5.0 g. of 2-methyl-5-vinylpyridine were added to 190 cc. of water containing 1.0 g. of sodium lauryl sulfate, 0.1 g. of potassium persulfate, and 0.1 g. of potassium metabisulfite. The resulting emulsion was allowed to polymerize for 15 hours at 35° C. There was then added 860 cc. of water containing 103.0 g. of acrylonitrile, 2.0 g. of 2-methyl-5-vinylpyridine, 1.0 g. of potassium persulfate, and 1.0 g. of potassium metabisulfite. The polymerization mixture was heated at 35° C. for 15 hours. The resultant polymeric product was completely soluble in dimethylformamide and could be spun into a fiber which had a tenacity of 3.2 g./d.

*Example 45*

2.7 g. of N-isopropylacrylamide, 0.3 g. of 2-methyl-5-vinylpyridine, and 0.3 g. of sodium lauryl sulfate were mixed well in 57 ml. of water, and 0.03 g. of potassium persulfate and 0.03 g. of potassium metabisulfite were added. The resultant emulsion was allowed to polymerize at 25° C. for 16 hours. There was then added 93 parts of distilled water containing 9.6 g. of acrylonitrile, 0.4 g. of N-isopropylacrylamide, 0.15 g. of potassium persulfate and 0.10 g. of potassium metabisulfite, and the mixture was allowed to polymerize at 35° C. for 15 hours. The resultant polymer was soluble in dimethylformamide and could be spun into fibers which had excellent alkali stability, and a high affinity for all classes of dyes. The dyed fiber had excellent resistance to fading.

*Example 46*

2.7 g. of N-methylmethacrylamide, 0.3 g. of 2-methyl-5-vinylpyridine, and 0.3 g. of sodium lauryl sulfate were mixed well in 57 ml. of water, and 0.03 g. of potassium persulfate and 0.03 g. of potassium metabisulfite were added. The resulting emulsion was allowed to polymerize at 25° C. for 16 hours. There was then added 93 parts of distilled water containing 9.5 g. of acrylonitrile, 0.5 g. of N-methylmethacrylamide, 0.1 g. of potassium persulfate, and 0.15 g. of potassium metabisulfite, and the mixture was allowed to polymerize at 35° C. for 15 hours. The resultant polymer was soluble in dimethylformamide and could be spun into fibers which had a tenacity of 2.5 g./d., and which had high affinity for all classes of dyes. The dyed fibers were resistant to fading.

*Example 47*

2.94 g. of N,N-dimethylacrylamide and 0.06 g. of 4-vinylpyridine were suspended in 30 ml. of distilled water containing 0.15 g. of sodium lauryl sulfate, and 0.03 g. of potassium persulfate, and 0.03 g. of potassium metabisulfite were added. The resulting emulsion was allowed to polymerize at 25° C. for 6 hours, at which time titration for residual N,N-dimethylacrylamide revealed that a 70% conversion to polymer had occurred. There was then immediately added 120 ml. of distilled water, 10 g. of acrylonitrile, 0.1 g. of potassium persulfate, and 0.1 g. of potassium metabisulfite. The polymerization mixture was heated at 35° C. for 6 hours, at which time titration for unreacted acrylonitrile indicated that 70% of it had copolymerized with the monomeric N,N-dimethylacrylamide. The polymer was immediately coagulated and isolated by filtration. It was completely soluble in dimethylformamide.

All of the modified polymers prepared as described hereinabove show excellent mechanical properties and improved affinity for dyes. Although the invention has been described in considerable detail with particular reference to certain preferred embodiments thereof, it will be understood that variations and modifications can be effected within the spirit and scope of the invention as described hereinabove and as defined in the appended claims.

What I claim is:

1. A process for preparing a resinous fiber-forming graft copolymer containing from 60 to 95% by weight of combined acrylonitrile which comprises contacting a polymerization reaction mixture consisting predominantly of water and containing (1) a peroxide polymerization catalyst and (2) from 40 to 5 parts by weight of a copolymer consisting of from 50 to 99% by weight of an amide represented by the following general formula:

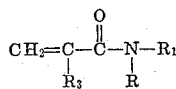

wherein R and $R_1$ each represents a member selected from the group consisting of a hydrogen atom and an alkyl group of from 1 to 4 carbon atoms and $R_3$ represents a member selected from the group consisting of a hydrogen atom and a methyl group, and from 50 to 1% by weight of a compound selected from the group consisting of a dissimilar amide represented by the above general formula and acrylonitrile, the said copolymer having been formed in and not separated from said mixture and containing from 70 to 100% of the original polymerizable monomers in said mixture, with (3) from 60 to 95 parts by weight of a monomer mixture consisting of from 85.0 to 99.5% by weight of acrylonitrile and from 15.0 to 0.5% by weight of a monomer represented by the above general formula, until at least 70% by weight of the monomers originally present in said reaction mixture have combined with said copolymer to give a graft copolymer containing from 60 to 95% by weight of combined acrylonitrile.

2. A resinous fiber-forming graft copolymer containing from 60 to 95% by weight of combined acrylonitrile obtained according to the process of claim 1.

3. A process for preparing a resinous fiber-forming graft copolymer containing from 60 to 95% by weight of combined acrylonitrile which comprises contacting a polymerization reaction mixture consisting predominantly of water and containing (1) a peroxide polymerization catalyst and (2) from 40 to 5 parts by weight of a copolymer consisting of from 50 to 99% by weight of an amide represented by the following general formula:

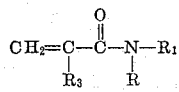

wherein R and $R_1$ each represents a member selected from the group consisting of a hydrogen atom and an alkyl group of from 1 to 4 carbon atoms and $R_3$ represents a member selected from the group consisting of a hydrogen atom and a methyl group, and from 50 to 1% by weight of acrylonitrile, and the said copolymer having been formed in and not separated from said mixture and containing from 70 to 100% of the original monomeric amide and acrylonitrile in said mixture, with (3) from 60 to 95 parts by weight of a monomer mixture consisting of from 85.0 to 99.5% by weight of acrylonitrile and from 15.0 to 0.5% by weight of a monomer represented by the above general formula, until at least 70% by weight of the monomers originally present in said reaction mixture have combined with said copolymer to give a graft copolymer containing from 60 to 95% by weight of combined acrylonitrile.

4. A resinous fiber-forming graft copolymer containing from 60 to 95% by weight of combined acrylonitrile obtained according to the process of claim 3.

5. A process for preparing a resinous fiber-forming graft copolymer containing from 60 to 95% by weight of acrylonitrile which comprises contacting a polymerization reaction mixture consisting predominantly of water and containing (1) a peroxide polymerization catalyst and (2) from 40 to 5 parts by weight of a copolymer of from 50 to 99% by weight of N-methyl methacrylamide and 50 to 1% by weight of acrylonitrile formed in and not separated from said mixture and containing from 70 to 100% of the monomeric N-methyl methacrylamide and acrylonitrile originally present in said mixture, with (3) from 60 to 95 parts by weight of a monomer mixture consisting of from 85.0 to 99.5% by weight of acrylonitrile and from 15.0 to 0.5% by weight of N-methyl methacrylamide, until at least 70% by weight of the monomers originally present in said reaction mixture have combined with said copolymer to give a graft copolymer containing from 60 to 95% by weight of combined acrylonitrile.

6. A resinous fiber-forming graft copolymer containing from 60 to 95% by weight of combined acrylonitrile obtained according to the process of claim 5.

7. A process for preparing a resinous fiber-forming graft copolymer containing from 60 to 95% by weight of acrylonitrile which comprises contacting a polymerization reaction mixture consisting predominantly of water and containing (1) a peroxide polymerization catalyst and (2) from 40 to 5 parts by weight of a copolymer of from 50 to 99% by weight of N-isopropylacrylamide and 50 to 1% by weight N-methyl methacrylamide formed in and not separated from said mixture and containing from 70 to 100% of the monomeric N-isopropylacrylamide and N-methyl methacrylamide originally present in said mixture, with (3) from 60 to 95 parts by weight of a monomer mixture consisting of from 85.0 to 99.5% by weight of acrylonitrile and from 15.0 to 0.5% by weight of N-isopropylacrylamide until at least 70% by weight of the monomers originally present in said reaction mixture have combined with said copolymer to give a graft copolymer containing from 60 to 95% by weight of combined acrylonitrile.

8. A resinous fiber-forming graft copolymer containing from 60 to 95% by weight of combined acrylonitrile obtained according to the process of claim 7.

9. A process for preparing a resinous fiber-forming graft copolymer containing from 60 to 95% by weight of acrylonitrile which comprises contacting a polymerization reaction mixture consisting predominantly of water and containing (1) a peroxide polymerization catalyst and (2) from 40 to 5 parts by weight of a copolymer of from 50 to 99% by weight of methacrylamide and from 50 to 1% by weight of N,N-dimethylacrylamide formed in and not separated from said mixture and containing from 70 to 100% of the monomeric methacrylamide and N,N-dimethylacrylamide originally present in said mixture, with (3) from 60 to 95 parts by weight of a monomer mixture consisting of from 85.0 to 99.5% by weight of acrylonitrile and from 15.0 to 0.5% by weight of methacrylamide until at least 70% by weight of the monomers originally present in said reaction mixture have combined with said copolymer to give a graft copolymer containing from 60 to 95% by weight of combined acrylonitrile.

10. A resinous fiber-forming graft copolymer containing from 60 to 95% by weight of combined acrylonitrile obtained according to the process of claim 9.

11. A process for preparing a resinous fiber-forming graft copolymer containing from 60 to 95% by weight of acrylonitrile which comprises contacting a polymerization reaction mixture consisting predominantly of water and containing (1) a peroxide polymerization catalyst and (2) from 40 to 5 parts by weight of a copolymer of from 50 to 99% by weight of N-methyl methacrylamide and from 50 to 1% by weight of N-tert-butylacrylamide formed in and not separated from said mixture and containing from 70 to 100% of the monomeric N-methyl methacrylamide and from 50 to 1% of N-tert-butylacrylamide originally present in said mixture, with (3) from 60 to 95 parts by weight of a monomer mixture consisting of from 85.0 to 99.5% by weight of acrylonitrile and from 15.0 to 0.5% by weight of N-methyl methacrylamide, until at least 70% by weight of the monomers originally present in said reaction mixture have combined with said copolymer to give a graft copolymer containing from 60 to 95% by weight of combined acrylonitrile.

12. A resinous fiber-forming graft copolymer containing from 60 to 95% by weight of combined acrylonitrile obtained according to the process of claim 11.

References Cited in the file of this patent

UNITED STATES PATENTS

| | | |
|---|---|---|
| 2,123,599 | Fikentscher et al. | July 12, 1938 |
| 2,486,241 | Arnold | Oct. 25, 1949 |
| 2,649,434 | Coover et al. | Aug. 18, 1953 |
| 2,657,191 | Coover et al. | Oct. 27, 1953 |
| 2,666,025 | Nozaki | Jan. 12, 1954 |
| 2,666,042 | Nozaki | Jan. 12, 1954 |
| 2,735,830 | Coover | Feb. 21, 1956 |
| 2,749,325 | Craig | June 5, 1956 |

FOREIGN PATENTS

| | | |
|---|---|---|
| 679,562 | Great Britain | Sept. 17, 1952 |
| 999,594 | France | Oct. 3, 1951 |